United States Patent [19]
Ricciardi et al.

[11] Patent Number: 5,423,455
[45] Date of Patent: Jun. 13, 1995

[54] MATERIALS FEEDING SYSTEM WITH LEVEL SENSING PROBE AND METHOD FOR AUTOMATIC BULK DENSITY DETERMINATION

[75] Inventors: Ronald J. Ricciardi, Woodcliff Lake; John S. Laidlaw, Pompton Plains, both of N.J.

[73] Assignee: Acrison, Inc., Moonachie, N.J.

[21] Appl. No.: 82,993

[22] Filed: Jun. 25, 1993

[51] Int. Cl.⁶ .......................................... G01G 11/14
[52] U.S. Cl. .......................................... 222/1; 73/434; 141/1; 141/83; 177/1; 177/4; 177/25.13; 177/66; 222/58; 222/63; 222/64
[58] Field of Search ................. 73/433, 434; 141/1, 141/83; 177/1, 4, 25.13, 25.14, 50, 60, 63, 66; 222/1, 23, 55, 56, 58, 63, 64, 77

[56] References Cited

U.S. PATENT DOCUMENTS

| | | |
|---|---|---|
| Re. 30,967 | 6/1982 | Ferrara et al. |
| Re. 32,101 | 4/1986 | Ricciardi et al. |
| Re. 32,102 | 4/1986 | Ricciardi et al. |
| 2,792,030 | 5/1957 | Wahl |
| 2,800,252 | 7/1957 | Wahl |
| 2,858,011 | 10/1958 | Wahl |
| 2,957,608 | 10/1960 | Wahl |
| 3,078,015 | 2/1963 | Wahl |
| 3,079,050 | 2/1963 | Wahl |
| 3,151,782 | 10/1964 | Wahl |
| 3,173,583 | 3/1965 | Wahl |
| 3,203,599 | 8/1965 | Renner |
| 3,252,618 | 5/1966 | Anderson et al. ............ 222/56 X |
| 3,257,040 | 6/1966 | Dumbaugh |
| 3,261,508 | 7/1966 | Wahl |
| 3,278,090 | 10/1960 | Wahl |
| 3,297,203 | 1/1967 | Wahl |
| 3,297,304 | 1/1967 | Wahl |
| 3,411,675 | 11/1968 | Wahl |
| 3,552,545 | 5/1971 | Hartman |
| 3,601,369 | 8/1971 | Wahl |
| 3,773,231 | 6/1972 | Wahl |
| 3,853,247 | 3/1972 | Wahl |
| 3,967,758 | 7/1976 | Ferrara ........................ 222/58 |
| 3,968,904 | 7/1976 | Neville ...................... 222/64 X |
| 4,054,784 | 10/1977 | Ricciardi |
| 4,111,272 | 8/1978 | Ricciardi |
| 4,131,193 | 12/1978 | Musschoot |
| 4,320,855 | 3/1982 | Ricciardi |
| 4,378,897 | 4/1983 | Kattelmann ................ 222/56 |
| 4,546,872 | 10/1985 | Musschoot |
| 4,766,964 | 8/1988 | Hirota et al. .............. 73/433 X |
| 4,804,111 | 2/1989 | Ricciardi et al. |
| 4,821,782 | 4/1989 | Hyer |
| 4,867,343 | 9/1989 | Ricciardi |
| 4,972,970 | 11/1990 | Toerner |
| 5,103,401 | 4/1992 | Johnson ..................... 222/56 X |
| 5,127,450 | 7/1992 | Saatkamp ................... 222/56 X |
| 5,184,754 | 2/1993 | Hansen ........................ 177/50 |

FOREIGN PATENT DOCUMENTS

| | | |
|---|---|---|
| 4014322A1 | 11/1991 | Germany |
| 2179588 | 3/1987 | United Kingdom |
| 89/07574 | 8/1989 | WIPO |

OTHER PUBLICATIONS

EPO, Search Report, Oct. 24, 1994.

*Primary Examiner*—Kevin P. Shaver
*Attorney, Agent, or Firm*—Davis Hoxie Faithfull & Hapgood

[57] ABSTRACT

An improved system and method for gravimetrically feeding material at a controlled rate. The material to be fed, which can be either a dry solid or a liquid, is maintained in a supply vessel. A probe disposed in the supply vessel detects the level of the material, sending a high level signal to a controller. A scale weighs the material in the supply vessel, sending a weight signal to the controller. The controller then calculates the density of the material in the supply vessel based on the weight and density of the material. The calculated density is used to affect the feed rate to achieve an operator-input set rate. During refill of the supply vessel, the probe detects material at a high level, sending a signal to the controller which, in turn, sends a signal to a refill valve, stopping refill.

13 Claims, 3 Drawing Sheets

MATERIALS FEEDING SYSTEM WITH LEVEL SENSING PROBE AND METHOD FOR AUTOMATIC BULK DENSITY DETERMINATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of material feeding systems, particularly, weight-loss type feeding systems having a periodic refill requirement.

BACKGROUND OF THE INVENTION

Precise metering of liquids and dry solids, such as amorphous powders, is an important but difficult task in many industrial applications and processes. Whenever such materials are continuously fed into a process, the feed rate at which material is delivered to the process must be controlled, just as with any other material used as an ingredient or additive in a continuous or batch process.

Types of material feeding systems include volumetric feeding systems and gravimetric feeding systems. As the name implies, volumetric feeding systems dispense material by volume. They employ a displacement mechanism of some sort (for example, an auger mounted below a supply vessel and feeding a fixed volume of material per auger rotation) operating at a set speed. This results in feeding a known volume of material. The weight of material fed can generally be determined based on the material's bulk density. Volumetric systems cannot always be relied on to produce good results because actual conditions, such as the density, flow and handling characteristics of the material, change during the feeding process.

Where a high degree of accuracy is required, gravimetric feeding systems are employed. These systems monitor their own feeding performance and automatically correct for variations from the desired or set feed rate regardless of product characteristics. Gravimetric systems control the feeding of material by weight, thereby compensating for changes in density and/or irregular product density, flow or handling characteristics. For this reason, these systems can provide much higher accuracy than volumetric feeding systems.

For weigh feeding of materials, there are various types of gravimetric systems used. Two typical types are weigh-belt and loss-in-weight feeding systems. Typical weigh-belt gravimetric feeding systems measure the weight of the material passing across the weigh-belt during operation, that is, while the belt is dispensing material. This measured weight is compared to an expected or "set" weight, causing the generation of a control signal. The control signal either increases, decreases or maintains the speed of the motor driving the belt to achieve a desired feed rate. While such weigh-belt systems offer good accuracy for many uses, material sometimes accumulates on the belt or other critical components and thereby causes the control system to improperly adjust the feed rate. The problem is compounded if the accumulated material builds up and then falls off critical sections of the weighing mechanism causing shifts in the calibration of the scale's "zero" calibration setting. Shifts in the scale's "zero" calibration setting can also be caused by temperature variations or differing tension of the weigh belt. Also, because of the flowing nature of certain materials, it can be difficult to reliably keep the material on the belt, thus causing additional inaccuracy. Similar to a weigh-belt system is a weigh auger system, which operates on the same principle as a weigh belt system, but uses an auger in lieu of a belt for dispensing product.

The weigh-belt and weigh-auger types of gravimetric feeding systems, therefore, while using feedback principles to offer control, have inherent limitations that can seriously impair the accuracy of these systems.

Another type of gravimetric feeding system usable for dry bulk solid and liquid materials is the loss-in-weight system. In a loss-in-weight system, the gradual decrease in weight of the entire system (including the discharge or feeding mechanism, such as an auger device or a pump, a supply vessel or dispensing bin attached to the feeding mechanism, and the material itself) caused by the constant release of material from the scale-mounted feeding mechanism is monitored and compared to an expected decrease in weight to assess performance. Unlike the weigh-belt and weigh-auger gravimetric systems, loss-in-weight systems are not affected by material adhering to or releasing from critical areas of the weighing mechanism, or a shift in the scale's "zero" or calibration, since the entire system is weighed continuously.

Preferably, the loss-in-weight feeding system is designed with a counterbalance so that the feeding mechanism is tared-out on the scale such that the scale produces a zero weight signal when the feeding mechanism is empty. Consequently, the scale only measures the weight of the material in the feeding mechanism. Knowing the size and type of the supply vessel and the feeding mechanism, the amount of weight attributable to the material in the supply vessel can be determined. In loss-in-weight systems, a control system continually (or with great frequency) monitors a signal indicating the decreasing total weight of the material, and adjusts the feed rate output to maintain an accurate rate of weight loss over time in relation to the selected feed rate (operator-input set rate). If a weight loss amount over a given time period is larger than expected as sensed by the weighing system, the control system commands the feeding mechanism to slow down. Similarly, if the weight detected becomes too high, indicating that the weight loss has been less than expected, the control system orders an increase in the material output flow rate to cause the system to catch up with the expected feed rate.

Representative control systems for loss-in-weight feeding systems are shown and described in U.S. Pat. Nos. Re. 30,967, Re. 32,101 and Re. 32,102, incorporated herein by reference, and all assigned to the assignee of the present invention, Acrison, Inc. Also, loss-in-weight feeding systems sold by the assignee of the present invention, Acrison, Inc., including microprocessor-based control systems therefor, are commercial examples of control systems for loss-in-weight feeding systems.

Depending upon the desired accuracy of feed rate, volumetric, weigh-belt/weigh-auger or loss-in-weight systems are used for feeding materials.

During standard operation, different samples of dry solid material can be of greatly varying bulk densities, even though the samples consist of the same material. In existing loss-in-weight systems, the weight of the material in the loss-in-weight system is continuously (or almost continuously) monitored. Automatic refill of the system's integral supply vessel is initiated when the monitored weight is sufficiently low and continued until the monitored weight reaches a predetermined high weight, at which point refill is stopped. If the material has a sufficiently lower bulk density than initially determined, however, the material may not be heavy enough to trigger the shut off of the automatic refill mechanism, even when the supply vessel is full because the predetermined high shut-off weight was determined based on the higher density (weight) material. Consequently, with a low bulk density material, refill continues, forcing the loss-in-weight system to remain out of gravimetric control (thereby reducing accuracy) and, perhaps, damaging the feeding system.

In other loss-in-weight systems, a material sensing probe is positioned in the supply vessel. When the probe senses a predetermined level of material, refill is shut off. See, e.g., U.S. Pat. Nos. 4,320,855, Re. 32,101, and Re. 32,102.

Loss-in-weight feeding systems generally have a control panel that displays the volume of material in its integral supply hopper. A controller determines the volume to be displayed based, in part, on a stored bulk density value for the material. When the bulk density of the actual material in the supply hopper differs from the bulk density value stored by the controller, the displayed volume is less accurate than is desired.

A relatively accurate bulk density measurement is required to control the feed rate as well. During operation, there are times when a loss-in-weight feeding system will not operate in loss-in-weight mode and will operate temporarily in a volumetric mode. For example, during refill, the weight signal is actually increasing as material is being added to the supply vessel and so the actual loss-in-weight signal cannot be used to determine the amount of material being fed. The weight of the material fed is often determined instead based on the volume of material displaced by a displacement mechanism (such as an auger) and by the density of the material. When the density employed by the controller is not accurate, the determination of the amount of material fed during such a period of time is less accurate than is desired.

At times during operation, the feeding system does not use loss-in-weight to control but rather controls based on an estimated motor speed. The controller selects a motor speed which corresponds to the set rate by interpolating from the known feed rate for a given motor speed. This is called the "fast start" routine. For example, when the feeding system is first started or when the operator inputs a new, different set rate, the system cannot operate in a loss-in-weight mode because there are insufficient weight readings at the new set rate to accurately measure the material flow and properly control the feeding system. Therefore, to obtain quickly an accurate feed rate at start up, the controller determines a motor speed estimate corresponding to the operator-input set rate based on the "maximum feed rate." Maximum feed rate (or "mfr") is the rate at which material flows when the motor is running at 100% of motor speed. If the maximum feed rate is 100 lbs/hr at 100% of motor speed and the set rate is 50 lbs/hr, the controller directs the motor to run at 50% of motor speed. The maximum feed rate, however, changes with the density of the material. Consequently, when the bulk density of the material used by the controller is not accurate, the feed rate in "fast start" mode is less accurate than is desired.

It is an object of this invention to provide an improved material feeding system with a material sensing probe disposed in the supply vessel for detecting material near the top of the supply vessel and stopping refill when the supply vessel is about to be overfilled.

It is a further object of this invention to provide an improved material feeding system capable of calculating the density of the material in the supply vessel.

It is a further object of this invention to provide an improved material feeding system capable of using the newly calculated density of the material to improve control of the feed rate of the feeder.

It is a further object of this invention to provide an improved material feeding system capable of accurately calculating and displaying the volume of material in the supply vessel.

It is a further object of this invention to provide an improved method of calculating the density of material located in a supply vessel.

It is a further object of this invention to provide an improved method of improving the control of a material feeding system based on the newly calculated density of the material.

SUMMARY OF THE INVENTION

The present invention is for a dry solid or liquid weight-loss feeding system having a probe positioned near the top of a supply vessel, such as a supply hopper or tank. The probe is capable of detecting material in the supply vessel at a predetermined level. The probe generates a signal to a controller indicative of the detection of material. The feed rate of the feeding system is controlled by the controller based, at least in part, on the signal from the probe.

The material feeding system may be further provided with a scale for measuring at least the weight of the material in the supply vessel. The probe detects material at a level corresponding to a known volume in the supply vessel. The density of the material is then calculated based on the measured weight and the volume of the supply vessel filled with material.

DETAILED DESCRIPTION

Figure 1:
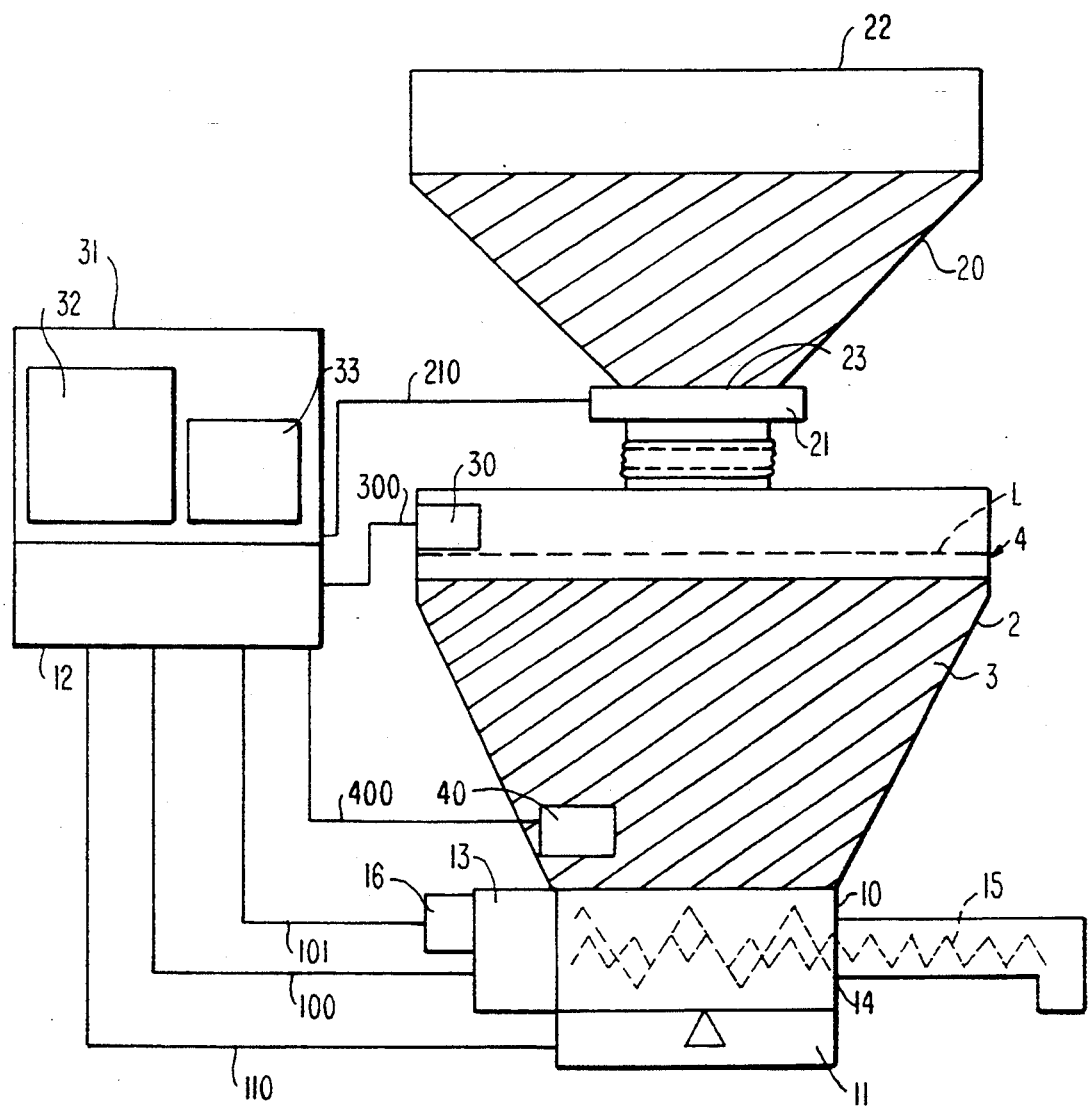
FIG. 1 is a schematic view of a feeding system of the present invention including a high level probe.

FIG. 1 shows schematically a portion of a material feeding system 1 including a materials supply vessel 2, discharge mechanism or feeding assembly 10 and controller 12. The materials supply vessel 2, such as a supply hopper 4, contains a level of material 3. The supply vessel 2 is commercially available from Acrison, Inc., assignee of this application, for example, model 400 Series feeders. The feeding assembly 10 is positioned beneath the supply vessel 2 such that material 3 flows from the supply vessel 2 into the feeding assembly 10. In a dry solids system, the feeding assembly 10 is typically an auger metering mechanism 14 with rotating auger 15 driven by a motor 13. When fluids are being fed, the feeding assembly is typically a pump. Acceptable loss-in-weight metering mechanisms are, for example, Acrison model 105, 140 or BDF feeder.

A refill supply source, such as refill hopper 20, is positioned above the supply vessel 2. The refill hopper 20 has a top inlet aperture 22 and a bottom outlet aperture 23 and is also filled with material. A refill valve 21 is disposed at the bottom aperture 23. Material to be fed is loaded into the refill hopper 20 through the inlet aperture 22.

A weighing mechanism or scale 11, for example, Acrison model 401, 402, 404, 405 or 406, is located beneath the feeding assembly 10. A high level probe 30 is positioned within the supply vessel 2, preferably at a high level L. The high level probe 30 is capable of detecting material in the supply vessel 2 at the level of the high level probe 30 and producing a signal to a weigh feeder controller 12 indicating that material is at that high level. The level L corresponds to a known volume within the supply hopper 2 up to that level. While it is preferred that the high level probe 30 be located near the top of the supply vessel 2, the probe 30 could be lower in the supply vessel 2 and still practice the present invention. Acceptable probes can be point level indicators or capacitive proximity sensors. Such probes detect material in various ways and are commercially available, for example, from Bindicator of Port Huron, Mich. as the Roto-Bin-Dicator or Breakdata 2200, from Custom Controls Co., Inc. of Broomall, Pa. as the Level Lance, and from Drexelbrook Engineering Co. of Horsham, Pa. as the LCS Point Level Control Model 10. Acceptable capacitive proximity sensors are commercially available from Pepperl & Fuchs, Inc., and others.

Preferably, the weigh feeder controller 12 is mounted in a control panel 31 having a panel display 32 such that the controller 12 can receive operator input from a keypad 33 on the panel 31. Particularly, the controller 12 preferably is able to receive input regarding the selected feed rate (or set rate) from an operator and to command the panel display 32 to display the volume of material 3 in the supply vessel 2. One acceptable controller to interface with the high level probe 30 is available from Acrison, Inc., as model MDII ® microprocessor-based weigh feeder controller.

The controller 12 is operatively engaged to the refill valve 21 via valve control line 210. The controller 12 can produce a valve control signal to open or close the refill valve 21. When the refill valve 21 is open, material can flow from the refill hopper 20 through the outlet aperture 23 to the supply vessel 2, thereby refilling the supply vessel 2.

The high level probe 30 is operatively engaged to the controller 12 via probe data line 300. The high level probe 30 produces a "high level" electrical signal to the controller 12 which indicates whether material is located in the supply vessel 2 at the level L of the probe 30.

The controller 12 is operatively engaged to the scale 11 via scale data line 110 such that the scale 11 can send a weight signal to the controller 12 representative of at least the weight of the material in the supply vessel 2.

The controller 12 is operatively engaged to the feeding assembly 10 via assembly control line 100. The controller 12 is capable of producing a motor command signal to the motor 13 of the feeding assembly 10 to control the feed rate by either increasing, decreasing or maintaining the motor speed. A shaft encoder 16 is connected to the motor 13 and generates an actual motor speed signal to the controller 12 via a motor speed line 101, indicative of the actual speed of the motor 13. In this way, the controller 12 keeps track of the present speed of the motor. Further, every rotation of the auger 15 displaces a known volume of material. The actual motor speed signal therefore corresponds to a displaced volume of material and the shaft encoder 16 also operates as a volumetric displacement meter.

The loss-in-weight feeding system is designed such that the weight of the entire loss-in-weight feeding system, namely, the feeding assembly 10, and its supply vessel 2, are tared-off or counter-balanced so that the scale 11 weighs only the material, producing an electrical weight signal to the controller 12 via scale data line 110 indicative of the weight of material measured. The controller 12 compares the weight measured at different times to determine the "loss in-weight," i.e. the weight of material fed by the feeding system over a period of time. In this way, the actual weight of the material fed is measured. This loss-in-weight is compared to an expected or "set" loss-in-weight, causing the generation of the motor command signal by controller 12. The command signal is transmitted to the motor 13 via assembly control line 100 to affect the motor speed, either increasing, maintaining, or decreasing it, to achieve the set weight loss. Control of a loss-in-weight feeding system in such a manner is well-known.

As material is fed from the feeding assembly 10, the total weight decreases. When the weight measured by the scale 11 reaches a predetermined low level, the controller 12 produces a valve control signal along valve control line 210 to actuate the refill valve 21. This opens refill valve 21 and allows material to flow into the supply vessel 2. Alternatively, a low level probe 40 can be placed at a low level in the supply vessel 2. The low level probe 40 produces a signal to the controller 12 via low level probe line 400 indicating that there is no material in the supply vessel 2 at the low level. The controller 12 then produces the valve control signal to open valve 21 and begin refill. In either case, the weight measured by scale 11 consequently increases.

In existing loss-in-weight feeding systems, the weight signal must reach a predetermined high level signal (from the scale) before the controller 12 sends a signal to close the refill valve and cease refill. During refill, the system no longer operates in a loss-in-weight mode, but rather operates in a volumetric mode.

Existing feeding systems can have problems arising from the varying density of the refilled material which may range in density from 30 to 400% of the density of the material 3 originally in the supply vessel 2. Such density variations cannot be easily predicted or controlled by an operator and occur even though the refilled material has the same composition. When the refill material has a very low bulk density, the predetermined high level weight signal may never be reached. Consequently, the refill valve 21 will remain open such that material overfills the supply vessel 2 during refill. Further, during refill, the loss-in-weight feeding system is operating in a volumetric mode which is generally less accurate than the gravimetric or loss-in-weight mode. Consequently, increasing the time spent in refill decreases the accuracy of the feeding system.

The varying density of the material can cause other problems in the operation of the feeding system. The controller 12 produces a signal to the control panel 31 indicative of the volume of the supply vessel filled with material based, in part, on the density of the material. This volume is displayed on the panel display 32. When the material density varies without a corresponding correction in the controller 12, the displayed material volume is less accurate.

When the controller 12 must invoke the "fast start" routine as described above in the Background of the Invention, the estimated motor speed for the new feed rate is determined based on the maximum feed rate which, in turn, is based in part on the bulk density of the material. When this density changes, the controller's estimate of the new motor speed is less accurate.

When the feeding system is operating in a volumetric mode, the feed rate or material output is determined based, in part, on the bulk density of the material. When the bulk density of the material varies without a corresponding correction in the controller 12, the determination of material fed in volumetric mode is less accurate. Consequently, updating the bulk density of the material in the controller 12 provides many benefits to the operation of a weight-loss feeding system for producing optimum performance.

Automatic Refill Shut Off

Figure 2:
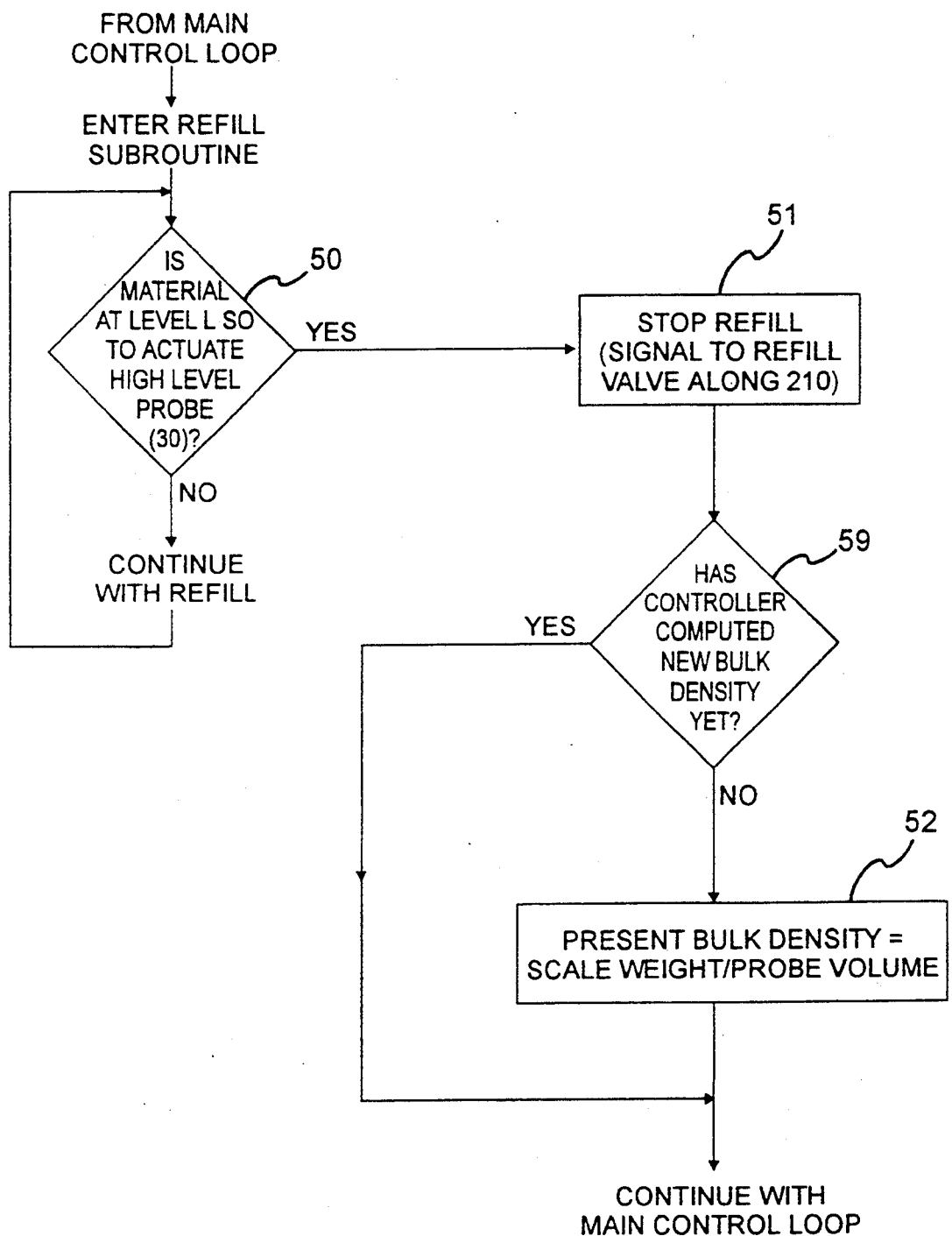
FIG. 2 is a block diagram showing the method of calculating material density after refill employed by the system of FIG. 1.

FIG. 2 is a block diagram showing a portion of the method of controller 12 during refill of the supply vessel 2. In the system of the present invention, refill begins when the weight signal from scale 11 reaches a predetermined low level settings (or when low level probe 40 indicates that there is no material at a low level in the supply vessel 2). Controller 12 then signals refill valve 21 to open, beginning refill. Material flows from the refill supply source, such as refill hopper 20 into the supply vessel 2. Refill is continued until the weight signal from the scale 11 reaches a predetermined high level setting or when high level probe 30 senses material 3 in the supply vessel 2 at the predetermined high level L (box 50). If the predetermined high level weight setting in supply vessel 2 is not reached due to a lower density product, the high level probe 30 produces a high level signal to the controller 12 along the probe data line 300, indicating that the supply vessel 2 is filled to level L. The controller 12 then sends a signal to the refill valve 21 along valve control line 210, closing the valve 21 and stopping refill (box 51). Consequently, material does not overfill the supply vessel 2 and the feeding system can return to loss-in-weight mode. The controller 12 is directed through this operation by a section of the control program which is reproduced below as the Automatic Refill Shut Off Routine.

Present Bulk Density Calculating

In accord with another aspect of the present invention, the bulk density of the material is recalculated after refill based on the actual weight and volume of the refill material in the supply vessel 2. The present bulk density is preferably calculated directly after refill so that the high level probe 30 can operate as a refill shut off mechanism as well as a material volume indicator. If the high level probe 30 was disposed lower in the supply vessel 2, the bulk density could still be calculated in accord with the present invention so long as the weight of the material in the supply vessel 2 is measured at the time that the probe 30 detects material corresponding to a predetermined volume. Since neither volumetric feeding systems nor weigh-belt/weigh-auger feeding systems generally come equipped with a scale capable of determining the weight of the material in its supply vessel 2, this aspect is intended presently for use with loss-in-weight feeding systems.

The material level L sensed by the high level probe 30 corresponds to a predetermined volume in the supply vessel 2 up to that level, i.e., "PROBE VOLUME" in FIG. 2, box 52. When the high level probe 30 detects material at level L, the volume of material in the supply vessel 2 is equal to the probe volume (or a full supply vessel 2 of a known volume). The scale 11 produces an electrical weight signal corresponding to the weight of the material in the entire the feeding system. The weight signal is transmitted to the controller 12 via scale data line 110. The weighing mechanism is designed such that the weight of the feeding system is eliminated, thus producing a weight signal corresponding solely to the net weight of the material in the feeding system. Knowing the type and size of the supply vessel 2 and the metering mechanism 14, the portion of the total weight attributable to the material in the supply vessel, i.e., "SCALE WEIGHT" in FIG. 2, box 52, can be determined in a known manner. If the bulk density has been calculated, the controller 12 returns to the main loop (box 59). If not, the controller 12 then calculates the present bulk density of the refilled material according to the following equation (box 52):

$$\text{PRESENT BULK DENSITY} = \frac{\text{SCALE WEIGHT}}{\text{PROBE VOLUME}} \qquad (1)$$

This calculation is performed by the section of the control program reproduced below as the Bulk Density Calculation Routine. After this calculation, the controller 12 returns to the main control loop.

Controller & Display

The controller 12 commands the panel display 32 to indicate the volume of the supply vessel 2 filled with material. The controller 12 determines the weight of the material in the supply vessel 2 as explained above. Using the present bulk density of the material, the controller 12 can determine the total volume of material in the supply vessel 2 in accord with the following equation:

$$\text{MATERIAL VOLUME} = \frac{\text{SCALE WEIGHT}}{\text{PRESENT BULK DENSITY}} \qquad (2)$$

The material volume is then divided by the total volume of the supply vessel 2, resulting in the percentage of supply vessel volume filled with material. The controller 12 commands the panel display 32 to display this percentage. This can be displayed continuously, at set time intervals, at the request of the operator or in other manners.

Volumetric Mode

Once the present bulk density of the material is calculated, it is used to affect the control of the feeding assembly 10 and the calculation of the amount of material fed. During operation of the loss-in-weight feeding system 1, the controller 12 will cause the feeding assembly 10 to operate in a volumetric mode at various times. This will occur, among other times, during refill, and also during a disturbance, such as an external sharp impact against the feeding system or collapsing bridged material in the supply vessel of a dry solids feeding system when the system enters, for example, the "Acri- Lok" mode, as explained, for example, in U.S. Pat. Nos. Re. 30,967, Re. 32,101 and Re. 32,102.

At all times, the controller 12 keeps track of the material feed rate to maintain the operator-input set rate. In the volumetric mode, the controller 12 determines the feed rate based on the volume of the material fed and the bulk density of the material being fed. In a preferred system, the feeding assembly 10 includes an auger metering mechanism 14 with a feed auger 15 driven by a motor 13. A shaft encoder 16 is operatively engaged to the motor and produces a signal corresponding to the motor speed, and thus the shaft speed. The auger 15 displaces a known volume of material per revolution of the motor ("auger displacement"). The shaft encoder 16 generates a signal corresponding to the actual motor speed and transmits the signal to the controller 12 via motor speed line 101. Consequently, controller 12 can determine the feed rate of material displaced by the auger 15 during a given period of operation from the actual motor speed signal received from the shaft encoder 16 in accord with the following equation:

$$\begin{pmatrix} \text{FEED RATE IN} \\ \text{VOLUMETRIC} \\ \text{MODE} \end{pmatrix} = \begin{pmatrix} \text{AUGER} \\ \text{DISPLACEMENT} \end{pmatrix} \times \begin{pmatrix} \text{ACTUAL} \\ \text{MOTOR} \\ \text{SPEED} \end{pmatrix} \times \begin{pmatrix} \text{PRESENT} \\ \text{BULK} \\ \text{DENSITY} \end{pmatrix} \quad (3)$$

As the feed rate of material displaced by the auger 15 (i.e., weight of material fed over a period of time) becomes known, it is compared to the set rate. The controller 12, in turn, generates a motor command signal to increase, maintain, or decrease motor speed to match material discharge to the set rate. Changing the bulk density to a more accurate measurement increases the accuracy of the feeding system when it shifts to a volumetric mode for whatever reason (refill, disturbance or fast start) and, thus, enhances the overall accuracy of the feeding system.

Fast Start

At times during operation of a loss-in-weight feeding system, standard loss-in-weight control will not get "on rate" as quickly as is desired. That is, standard loss-in-weight control will not change the motor speed to reach a desired set rate fast enough to achieve the required feed rate and/or metering accuracy, particularly when first turned on. To address this problem, the controller 12 is equipped with a "fast start" routine that quickly adjusts the motor speed to quickly achieve the new set rate. Optionally, the controller can be designed such that, when the operator inputs a new desired set rate which differs from the present set rate by a predetermined amount (e.g., 20%), the fast start routine will be actuated. The predetermined amount should be adjustable by the operator.

Assuming that feed rate and motor speed are linearly related from no or zero feed rate at zero motor speed up to a maximum feed rate at 100% of motor speed, the controller 12 determines the speed at which the motor 13 should run based on the relationship of the desired set rate to maximum feed rate. If the maximum feed rate (i.e., the feed rate if the motor was operating at 100% of speed) is 100 lbs/hr and the new set rate is 75 lbs/hr, the controller 12 will signal the motor 13 via assembly control line 100 to run at 75% of maximum speed. Once the motor 13 has been operating at the new speed for a sufficient time, loss-in-weight control can continue.

The maximum feed rate, however, varies as the bulk density of the material changes. In existing feeding systems, the present bulk density of the material being fed is estimated, for example, every 15 seconds based on the present motor speed and the present feed rate as explained below.

Figure 3:
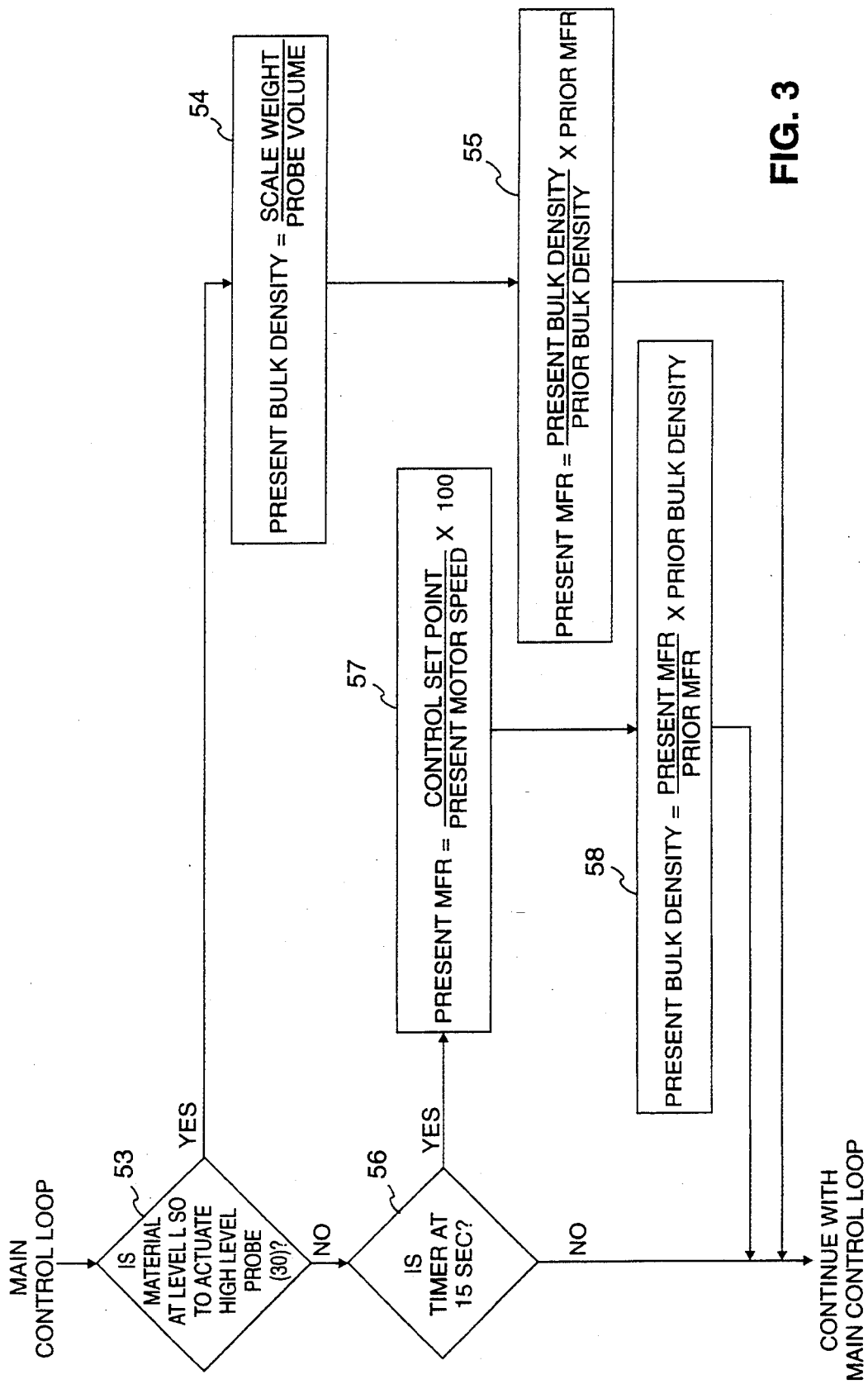
FIG. 3 is a block diagram of the method of maximum rate/bulk density auto compensation employed by the system of FIG. 1.

In the system of the present invention, bulk density can be calculated directly and used to adjust the maximum feed rate as is necessary. As shown in FIG. 3, which is a block diagram of the maximum rate/bulk density auto compensation function, the controller 12 determines whether there is material on the high level probe 30 (box 53). If so, a present bulk density is calculated in accord with eq. 1, above (box 54). The present maximum feed rate is then determined in accord with the following equation (box 55):

$$\text{PRESENT } MFR = \left( \frac{\text{PRESENT BULK DENSITY}}{\text{PRIOR BULK DENSITY}} \right) \times (\text{PRIOR } MFR) \quad (4)$$

The prior bulk density and the prior maximum feed rate were stored by the controller 12 from the previous determination of these values. This new maximum feed rate is used in the "fast start" calculation.

If material is not detected by the high level probe 30, the controller 12 continues with standard operation. When the controller 12 determines that the timer is at 15 seconds (box 56), the bulk density is calculated by a portion of the control program reproduced below as the Max Rate/Bulk Density Auto Compensation Routine. Initially, it is assumed the feeding system is feeding material at the control set point input by the operator. Then, the controller 12 determines the speed at which the motor 13 is presently running (from shaft encoder 16) as a percentage of the maximum motor speed. This percentage is the present motor speed. A present maximum feed rate (or present mfr) is calculated in accord with the following equation (box 57):

$$\text{PRESENT } MFR = \left( \frac{\text{CONTROL SET POINT}}{\text{PRESENT MOTOR SPEED}} \right) \times 100 \quad (5)$$

Optionally, limits can be placed on the present maximum feed rate such that no drastic changes occur in the control of the feeding system. One acceptable limit on the range of the present maximum feed rate is within 2.5% of the prior maximum feed rate. If the present maximum feed rate as calculated in accord with eq. 5 is outside that range, the present maximum feed rate can be set equal to the upper or lower limit, depending on whether the calculated present feed rate is above or below the range, respectively. Also, the calculation of present maximum feed rate is not performed if a feed rate deviation alarm is present, a refill is in progress or has just completed, or an Acri-Lok alarm is present.

Once the present maximum feed rate is determined, the present bulk density is calculated in accord with the following equation (box 58):

$$\text{PRESENT BULK DENSITY} = \left(\frac{\text{PRESENT } MFR}{\text{PRIOR } MFR}\right) \times \text{PRIOR BULK DENSITY} \quad (6)$$

The present bulk density is used, as explained above, in the control of the feeding system during operation in a volumetric mode and to control the calculation of the volume of material in the supply vessel 2.

As can be seen, applicants' invention permits more accurate display of material volume in the supply vessel 2, more accurate operation of the feeding system, and more accurate estimates of the new motor speed in fast start.

Automatic Refill Shut Off Routine

One example of an automatic refill shut off routine written in C language is shown below.

```
                        Copyright © 1992 Acrison, Inc.
                              All Rights Reserved
void Refill(void)
{
    static int          Refill_Delay_Timer, Refill_Turnoff_Timeout;
    static int          Deviation_Refill_Block, Pulsed_Timer;
    if (Pulsed_Timer)
    {
        System.Pulsed_Output = TRUE;
        if (--Pulsed_Timer == 0)
            System.Pulsed_Output = FALSE;
    }
//  if we are in Batch In, or have No Scale, or are in External Fast mode,
//  are in Weigh Vessel mode, or High Level Probe, we cancel (force off) refills.
    if (System.Batch_In || System.No_Scale_Signal || System.Mode5 || Batch_Direction_Setpoint == 2 ||
        System.High_Level_Probe)
    {
        Turn_Off_Refill(&Deviation_Refill_Block);
        return;
    }
    if (Refill_Delay_Timer)                   // If "Refill Delay" is set . . .
    {
        if (--Refill_Delay_Timer == 0)        // And reaches zero . . .
        {
            Previous_Totalfed = Total_Fed;
            Previous_Totalfed_2 = Total_Fed_2;
            Previous_Batch_Fed = Batch_Fed;
            Previous_Scale_Weight = Scale_Weight_In_Units;
            Previous_Scale_Weight_2 = Scale_Weight_In_Units;
            Previous_Scale_Weight_Batching = Scale_Weight_In_Units;
            Start_Band = SECONDS(Start_Band_Setpoint);      // We go into Fast Start
            Acrilok_Timer = 0;                              // and set all other flags
            Alarm.Bit.Acrilok = FALSE;                      // accordingly
            Alarm.Bit.Deviation = FALSE;
            if (Compensation_Selection)
            {
                High_Level_Sample_Delay = SECONDS(60);
                Compensation_Average_Period = SECONDS(5);
                Compensation_Level_Sum = 0;
                Compensation_FeedRate_Sum = 0;
                Compensation_MotorSpeed_Sum = 0;
            }
        }
    }
//  If external input refill contacts close, Go into refill. But set a flag
//  so you only do it once. Reset flag when contact reopens.
    if (System.External_Refill_Contact)
    {
        if (!System.Digital_In_Refill_Request)
        {
            Refill_ON();
            System.Digital_In_Refill_Request = TRUE;
        }
        else
            System.Digital_In_Refill_Request = FALSE;
    }
//  If power was just turned on a few seconds ago, or refill is being
//  canceled, shut it off.
    if (Ignore_Readings || System.Manual_Refill_Cancel)
    {
        Turn_Off_Refill(&Deviation_Refill_Block);
        return;
    }
//  If the following self explanatory condition is true, a refill request will be latched.
    if (S1.Bit.Low_Level && S1.Bit.Auto_Fill && !System.Low_Level_Latched &&
        !System.Prevent_Refill_Restart) System.Low_Level_Latched = TRUE;
    if (S1.Bit.Refill_ON)                                   // If in refill . . .
    {
        Refill_Delay_Timer = SECONDS(Fast_After_Refill);    // Set the Refill Delay timer
        Batch_Settle_Delay = SECONDS(Batch_Start_Delay);    // Set the Batch Settling delay timer
```

```
        if (Refill_Turnoff_Timeout)                          // If the Refill timeout counter is set . . .
            if (--Refill_Turnoff_Timeout == 0)               // and it reaches zero . . .
            {
                Turn_Off_Refill(&Deviation_Refill_Block);    // Shut off Refill
                Error_Number = 8;                            // Throw up the error message
                System.Refill_Expired = TRUE;                //Set status flag
                S3.Bit.Refill_Expired = TRUE;
                Pulsed_Timer = SECONDS(10);                  // Start "pulsed" output contact
                if (Stop_On_Empty_Or_RTO)                    // and if cal entry says to STOP,
                    Emergency_Stop();                        // we STOP
                return;
            }
    }
//  When we reach High Level OR Overfill we shut off Refill.
    if (S1.Bit.High_Level || S2.Bit.Overfill)
    {
        Turn_Off_Refill(&Deviation_Refill_Block);
        return;
    }
//  If a manual refill is requested, we set the request here.
    if (System.Manual_Refill_Request)
    {
        System.Low_Level_Latched = TRUE;
        System.Manual_Refill_Request = FALSE;
    }
//  If no refill requests are pending, we are all done in this function.
    if (!System.Low_Level_Latched)
        return;
//  If we batching and we dont have Batch complete and are running and
//  Batch through Refill is off, we Stop, set the restart timer, and wait for
//  the Totalizer delay to expire. Then we go into refill.
    if (Batch_Flags.Batching)
    {
        if (!Batch_Flags.Batch_Complete && System.Running && Batch_Thru_Refill == 0)
        {
            Emergency_Stop();
            Batch_Waiting_To_Restart = SECONDS(25);
        }
        if (Batch_Total_Delay && Batch_Thru_Refill == 0)
            return;
    }
//  If we have a Deviation at the time Refill is requested, we delay going
//  into refill in the hopes the deviation will end. If it doesn't end
//  before the timer expires, we go into refill anyway.
    if (S2.Bit.Deviation)
        if (Deviation_Refill_Block)
        {
            --Deviation_Refill_Block;
            return;
        }
//  If we pass all conditions and get to this point, we start a Refill.
    Turn_On_Refill(&Refill_Turnoff_Timeout);
```

Bulk Density Calculation Routine

One example of a bulk density calculation routine written in C language is shown below.

Max Rate/Bulk Density Auto Compensation Routine

One example of a max rate/bulk density auto compensation routine written in C language is shown below.

Copyright © 1992 Acrison, Inc.
All Rights Reserved

```
void High_Level_Probe(void)
{
    static int done;
    if (System.Digital_Inputs_Used && System.High_Level_Probe && Probe_Volume && done == 0)
    {
        Bulk_Density = Scale_Weight_In_Units / Probe_Volume;
        done = -1;
    }
    if (!System.High_Level_Probe)
        done = 0;
}
```

Copyright © 1992 Acrison, Inc.
All Rights Reserved void Compute_Change_To_Maxrate(void)

```
{
    static   int timer = SECONDS(15);
    double Motor_Correction, upper_limit, lower_limit, temp;
    if (!System.Running || S1.Bit.Refill_ON || Alarm.Current_Alarms || S2.Bit.Fast_Start ||
        System.High_Level_Probe || Control_Mode > timer = SECONDS(15);
    if (Compensation_Selection = = 4)
        return;
    if (--timer)
        return;
    timer = SECONDS(15);
    temp = Max_Feed_Rate * .025;
    upper_limit = temp + Max_Feed_Rate;
    lower_limit = Max_Feed_Rate − temp;
    temp = Control_Setpoint / (Motor_Command / 100);
    if (temp > upper_limit)
        Max_Feed_Rate = upper_limit;
    else if (temp < lower limit)
        Max_Feed_Rate = lower_limit;
    else
        Max_Feed_Rate = temp;
    Mis_Feed_Rate = Max_Feed_Rate * .5;
    if (Compensation_Selection ! = 3)
        Bulk_Density = (Max_Feed_Rate / Prior_Max_Feed_Rate) * Prior_Bulk_Density
    Prior_Max_Feed_Rate = Max_Feed_Rate;
    Prior_Mid_Feed_Rate = Mid_Feed_Rate;
    Prior_Bulk_Density = Bulk_Density;
    Last_Bulk_Density = Bulk_Density;
}
```

Applicants' invention is not limited to the embodiments described above, but it is understood that applicants' invention is as set forth in the following claims.

We claim:

1. A method of operating a loss in weight feeding system for feeding material at a controllable feed rate, comprising the steps of:
    filling a supply vessel with material to be fed;
    weighing at least the material in the supply vessel;
    sensing the level of the material in the supply vessel wherein the steps of weighing and level sensing are performed on the same material;
    calculating the present bulk density of the material based on the level of the material and the weight of the material;
    feeding material from the supply vessel at a controllable feed rate based at least in part on the present bulk density of the material.

2. The method of claim 1 wherein the step of feeding material comprises rotating an auger at a rotation rate within a metering system at a controllable rotation rate wherein the auger is capable of displacing a volume of material.

3. The method of claim 2 further comprising the step of calculating the feed rate based, at least in part, on the rotation rate.

4. The method of claim 3 further comprising the step of determining the weight of the material fed based on the volume of material displaced and the present bulk density of the material.

5. The method of claim 1 further comprising the step of calculating the volume of material in the supply vessel based on the weight of the material and the present bulk density of the material.

6. The method of claim 5 further comprising the step of displaying the volume of material in the supply vessel.

7. The method of claim 1 further comprising refilling the supply vessel when a predetermined amount of material remains in the supply vessel.

8. The method of claim 7 further comprising the step of stopping refill when a predetermined level of material is sensed.

9. A method of controlling the feed rate of a material feeding system to achieve a desired feed rate, the system having a supply vessel filled to a level with material, a refill means, a level sensing means, a feeding assembly for feeding material from the supply vessel at a selected feed rate, wherein the assembly has a motor with a maximum speed, a scale and a controller, comprising the steps of:
    sensing the level of material in the supply vessel and generating a high level signal corresponding to the level of material;
    transmitting the high level signal to the controller;
    weighing the feeding system and generating a weight signal corresponding at least to the weight of the material in the supply vessel;
    transmitting the weight signal to the controller;
    calculating a maximum feed rate based in part on the high level signal and the weight signal; and
    controlling the feed rate based in part on the maximum feed rate by generating and transmitting a control signal from the controller to the motor so that the motor runs at a desired speed.

10. The method of claim 9 wherein the desired speed is determined by multiplying the maximum speed of the motor by the ratio of the selected feed rate and the maximum feed rate.

11. The method of claim 9 further comprising the step of refilling the supply vessel when a predetermined amount of material remains in the supply vessel.

12. A method of feeding material at a controllable rate comprising the steps of:
    placing material to be fed having a bulk density into a supply vessel;
    releasing material from the supply vessel into a feeding mechanism;
    displacing material from the feeding mechanism at a controllable displacement rate;

refilling the supply vessel with new material when a pre-determined amount of material remains in the supply vessel;
weighing at least the material in the supply vessel;
sensing the level of material in the supply vessel wherein the steps of weighing and level sensing are performed on the same material; and
calculating the bulk density of the new material in the supply vessel based at least in part on the weight of the new material in the supply vessel and the level of new material in the supply vessel.

13. The method of claim 12 further comprising the steps of stopping refill when the material reaches a predetermined level.

* * * * *